(12) United States Patent
Sorenson et al.

(10) Patent No.: US 7,793,226 B2
(45) Date of Patent: Sep. 7, 2010

(54) METHOD AND SYSTEM FOR GROUPING AND STACKING TAB USER INTERFACE OBJECTS WITH ICON STATUS INDICATORS

(75) Inventors: Michael Whitney Sorenson, Cambridge, MA (US); Ethan Perry, Arlington, MA (US); Andrew S. Joslin, Jamaica Plain, MA (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 11/464,243

(22) Filed: Aug. 14, 2006

(65) Prior Publication Data

US 2008/0040682 A1 Feb. 14, 2008

(51) Int. Cl.
*G06F 15/10* (2006.01)
(52) U.S. Cl. ............... 715/777; 715/835; 715/810; 715/853
(58) Field of Classification Search ........... 715/777, 715/835, 810, 853
See application file for complete search history.

(56) References Cited

U.S. PATENT DOCUMENTS

| 5,140,678 | A | | 8/1992 | Torres | |
|---|---|---|---|---|---|
| 5,442,795 | A | | 8/1995 | Levine et al. | |
| 5,500,929 | A | * | 3/1996 | Dickinson | 715/853 |
| 5,515,497 | A | | 5/1996 | Itri et al. | |
| 5,550,969 | A | * | 8/1996 | Torres et al. | 715/787 |
| 5,714,971 | A | * | 2/1998 | Shalit et al. | 715/804 |
| 5,809,230 | A | * | 9/1998 | Pereira | 726/35 |
| 6,097,391 | A | * | 8/2000 | Wilcox | 715/776 |
| 2006/0150119 | A1 | * | 7/2006 | Chesnais et al. | 715/810 |
| 2006/0271861 | A1 | * | 11/2006 | Yolleck et al. | 715/760 |
| 2008/0005686 | A1 | * | 1/2008 | Singh | 715/764 |
| 2008/0189645 | A1 | * | 8/2008 | Kapanen et al. | 715/777 |

FOREIGN PATENT DOCUMENTS

| WO | WO 03025899 | * | 9/2001 |
|---|---|---|---|
| WO | WO03025899 | * | 9/2002 |

OTHER PUBLICATIONS

Lenz et al., "Unifying the Cisco Intranet through Hierarchical Navigation", CHI 2005, Design Expo, Portland, Oregon, Apr. 2-7, 2005, pp. 1004-1021.

(Continued)

*Primary Examiner*—William L Bashore
*Assistant Examiner*—Ece Hur
(74) *Attorney, Agent, or Firm*—David A. Dagg (57) ABSTRACT

A method and system for grouping and stacking tab user interface objects with icon status indicators. Tabs are grouped together, and each tab group is visually represented by a single top tab, under which all tabs in the group are stacked. The top tab of a tab group provides visual indication through one or more icons of which tab in the group is currently selected, and of at least one status of each tab in the group. The tab groups may be displayed as part of a row or rows of tabs that provide the user with control over the contents of an associated view pane. The user can select a tab group to be currently active with respect to other tabs in the tab row(s) in the user interface by clicking on the top tab for that group.

11 Claims, 6 Drawing Sheets

OTHER PUBLICATIONS

Furuta et al., "Document Formatting Systems: Survey, Concepts, and Issues", Computing Surverys, vol. 14, No. 3, Sep. 1982, pp. 417-472.

Willis et al., "Tablet PC's as Instructional Tools or the Pen is Mightier than the Board!", SIGITE '04, Oct. 28-30, 2004, Salt Lake City, Utah, pp. 153-159.

* cited by examiner

METHOD AND SYSTEM FOR GROUPING AND STACKING TAB USER INTERFACE OBJECTS WITH ICON STATUS INDICATORS

FIELD OF THE INVENTION

The present invention relates generally to computer generated graphical user interfaces, and more specifically to a method and system for grouping and stacking tab user interface display objects with icon status indicators.

BACKGROUND OF THE INVENTION

As it is generally known, in the area of graphical user interfaces (GUIs), a tab display object is a small, typically rectangular box, often containing a text label, that is associated with some amount of corresponding user interface functionality and/or content. The functionality and/or content associated with a tab is sometimes referred to as one or more corresponding "widgets". The term "widget" may refer to any part of a GUI that allows a user to interface with application and/or operating system programs or online content. Often, widgets display information and invite the user to perform one or more actions. Typical widgets include buttons, dialog boxes, pop-up windows, pull-down menus, icons, scroll bars, resizable window edges, progress indicators, selection boxes, windows, tear-off menus, menu bars, toggle switches, forms, and other GUI components and/or content.

When a tab is activated, for example by way of a mouse click or the like, a view pane displays the widget or widgets associated with the tab, which is then considered the currently active (or foreground) tab. In existing systems, multiple, horizontally arranged tabs allow a user to switch between different widgets. Generally, the currently active tab is visually highlighted in some way so that it appears to be in front of the other displayed tabs. Alternatively, the currently active tab is sometimes visually indicated by its color or size.

Any specific type of program may include a tabbed user interface. For example, many existing application programs include tabbed user interfaces. Tabs are also widely used in control panels and other setting dialogs, and some Web browsers enable users to switch between Web pages using corresponding tabs represented in the user interface.

A problem with existing systems arises from the fact that there is limited space available to display tabs. As a result, when the number of tabs becomes sufficiently high, a horizontal row of tabs may be truncated, such that not all tabs are viewed at once. Alternatively, several rows of tabs may be displayed, cutting down on the screen space available for other purposes. In at least one existing system, not all available tabs are shown at once, and instead a horizontal arrow is displayed which allows the user to view a listing of available tabs, and to select a tab to become the currently active tab. However, this solution does not allow the user with convenient access to any useful information except the names of the tabs that are available. In addition, no grouping of available tabs is provided, since only a simple listing of the tabs that are not shown is displayed.

For the above reasons and others, it would be desirable to have a new system for providing tabs in a graphical user interface. The new system should advantageously enable large numbers of available tabs to be conveniently accessed by the user, allow tabs to be organized into related groups, and make status and/or state information regarding widgets and/or other display objects or content associated with each tab in a group immediately viewable to the user.

SUMMARY OF THE INVENTION

To address the above described and other shortcomings of previous solutions, a new method and system are disclosed for grouping and stacking tab user interface objects with icon status indicators. In the disclosed system, tabs are grouped together, and each tab group is visually represented by a single top tab, under which all tabs in the group are stacked. The top tab of a tab group also provides visual indication through one or more icons of which tab in the group is currently selected, and of at least one status of each tab in the group. The visual indication of status for each tab in the group includes visual indication of status for those tabs in the group that are not currently selected, and accordingly whose display items are not currently being displayed in the view pane. The disclosed system monitors user actions in order to change the visual indication of which tab in the group is currently selected as the user selects different tabs in the group, and in order to change the visual indication of the state of each tab in the group as the user changes the states of individual tabs in the group.

One or more tab groups may be displayed as part of a row or rows of tabs that provide the user with control over the contents of an associated view pane. The user can select a tab group to be currently active with respect to other tabs in the tab row(s) in the user interface by clicking on the top tab for that group.

When a menu activation portion of the top tab for a group is clicked on by the user, a menu is generated that allows the user to indicate (e.g. click on) any tab within the group in order to cause that tab to become the currently selected tab for the group. The menu activation portion of the top tab that enables access to the tabs in the group may be indicated by a display object such as an arrow pointing downward displayed as part of the top tab for the group. The display items associated with the currently selected tab in a group are displayed in the associated view pane when that tab group is currently active within the tab row(s).

In one embodiment, the top tab for a tab group displays a separate icon for each of the tabs in the group, and each icon represents visually whether the corresponding tab is currently selected, and also a state associated with that tab.

The disclosed system provides many advantages over previous systems. For example, the disclosed system saves space in the user interface for other features available to the user. In addition, the disclosed system allows tabs to be grouped in any relevant way, potentially increasing user understanding of the grouped tabs in general and what the display items associated with each tab in the group may be. Furthermore, the disclosed icon(s) in the top tab for a group changes to reflect state changes in all tabs in the group, and gives the user an immediate visual indication of the current state of all tabs in the group without requiring the user to click through to each tab and bring their associated display items into the view pane. Multiple tabs in a tab row may each be the top tab of a corresponding tab group, and the user accordingly may have simultaneous and immediate access to visual state information about several groups of tabs at once.

Thus there is disclosed a new system for providing tabs in a graphical user interface. The new system advantageously enables large numbers of available tabs to be conveniently accessed by the user, allows tabs to be organized into related groups, and makes information regarding widgets and/or other display objects or content associated with each tab in one or more tab groups simultaneously and immediately viewable to the user.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
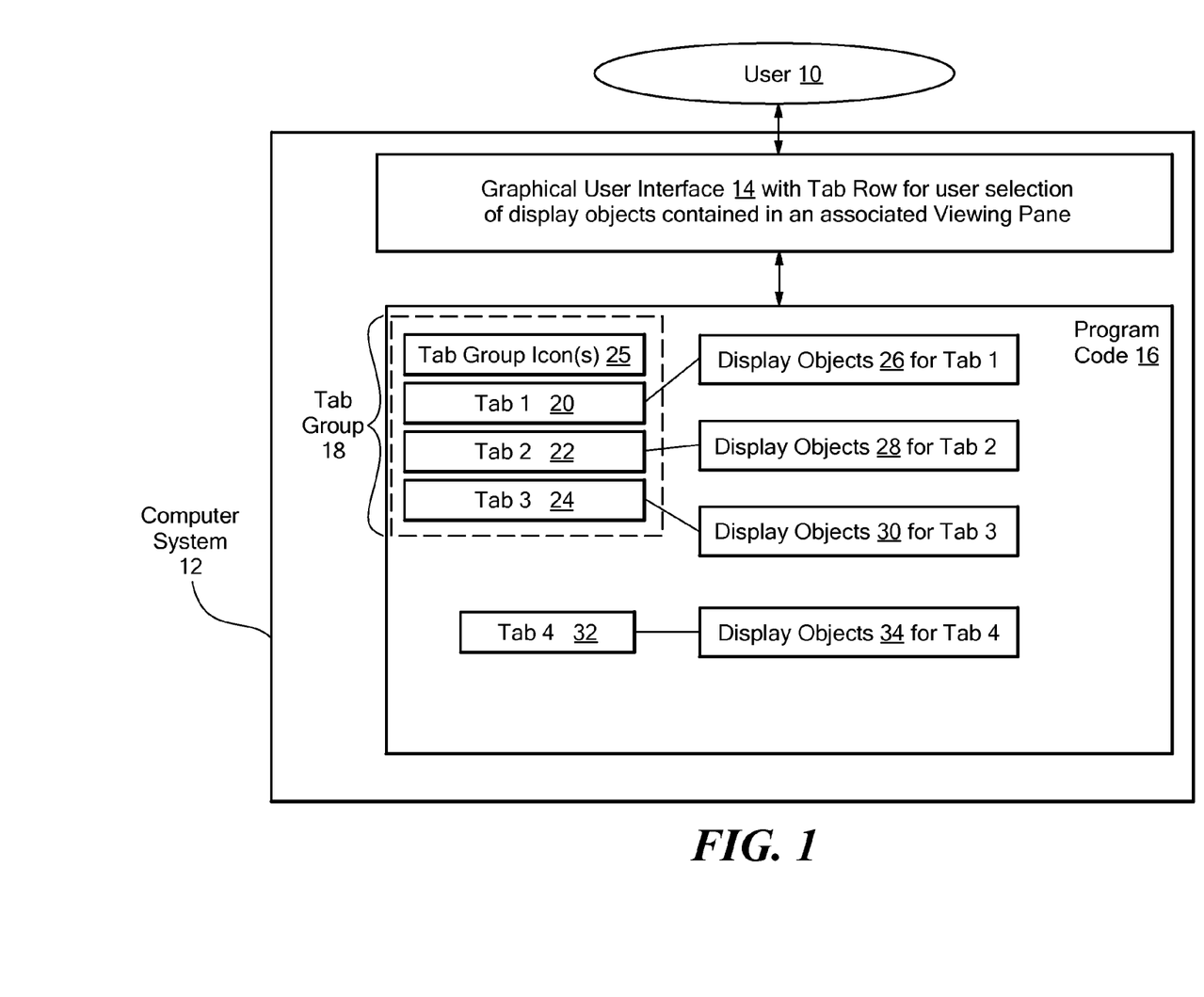
FIG. 1 is a block diagram showing components in an illustrative embodiment of the disclosed system.

As shown in FIG. 1, an illustrative embodiment of the disclosed system operates in a Computer System 12, in which Program Code 16 executes to provide the Graphical User Interface 14 to the User 10. The Graphical User Interface 14 includes a tab row that enables a user to select the display objects to be displayed in an associated viewing pane within the Graphical User Interface 14. The Program Code 16 is further shown including and/or having access to a Tab Group 18, which includes the tab display objects Tab 1 20, Tab 2 22, and Tab 3 24. The Tab Group 18 further includes Tab Group Icon(s) 25. When displayed in the Graphical User Interface 14, the Tab Group Icon(s) 25 visually represent which of the tab display objects in the Tab Group 18 is currently selected by the user, and a state or status of each of the tab display objects in the Tab Group 18.

As further shown in FIG. 1, each of the tab display objects in the Tab Group 18 is associated with corresponding display objects. For example, Tab 1 20 is associated with Display Objects 26, Tab 2 22 is associated with Display Objects 28, and Tab 3 24 is associated with Display Objects 30.

A Tab 4 32 is also included in or accessible to the Program Code 16, and is included in the tab row of the Graphical User Interface 14 along with a top tab display object for the Tab Group 18 that includes the Tab Group Icon(s) 25.

The computer system 12 may, for example, include at least one processor, program storage, such as memory, for storing program code executable on the processor, and one or more input/output devices and/or interfaces, such as data communication and/or peripheral devices and/or interfaces. The computer system 12 may further include appropriate operating system software. The computer system 12 may be any specific type of computer system or other type of client electronic device. Accordingly, examples of such client systems or devices may include, but are not limited to, desktop computer systems, PDAs (Personal Digital Assistants), cell phones, tablet PCs, or any other appropriate device capable of providing a graphical user interface to a user.

While for purposes of concise illustration only four tab display objects and one tab display object group are shown in FIG. 1, the disclosed system is not limited to any specific number of tab display objects and/or groups, and may accordingly be embodied such that any specific number of tab display objects and/or groups are provided.

The display objects 26, 28, 30 and 34 may include or consist of any specific type of user interface component or content, including but not limited to one or more widgets and/or Web pages. The Tab Group Icons 25 may be made up of any specific number of icons having any specific layout and/or shape, and the tab display objects 20, 22, 24 and 32 may be any specific geometric shape, for example rectangles, and may each include a respective text title that is descriptive of the respective display objects the tab display object is associated with.

During operation of the embodiment shown in FIG. 1, the program code 16 displays a top tab display object as part of the tab row in the Graphical User Interface 14. The top tab display object represents the group 18 of tab display objects. The top tab display object includes the Tab Group Icon(s) 25. The User 10 clicks on the top tab display object for the Tab Group 18 in order to make the Tab Group 18 active within the tab row in the Graphical User Interface 14. Clicking on a menu activation portion of the top tab display object also causes a tab selection menu to be generated that enables the User 10 to select one of the tab display objects in the Tab Group 18 as the currently selected tab display object of the group.

Figure 2:
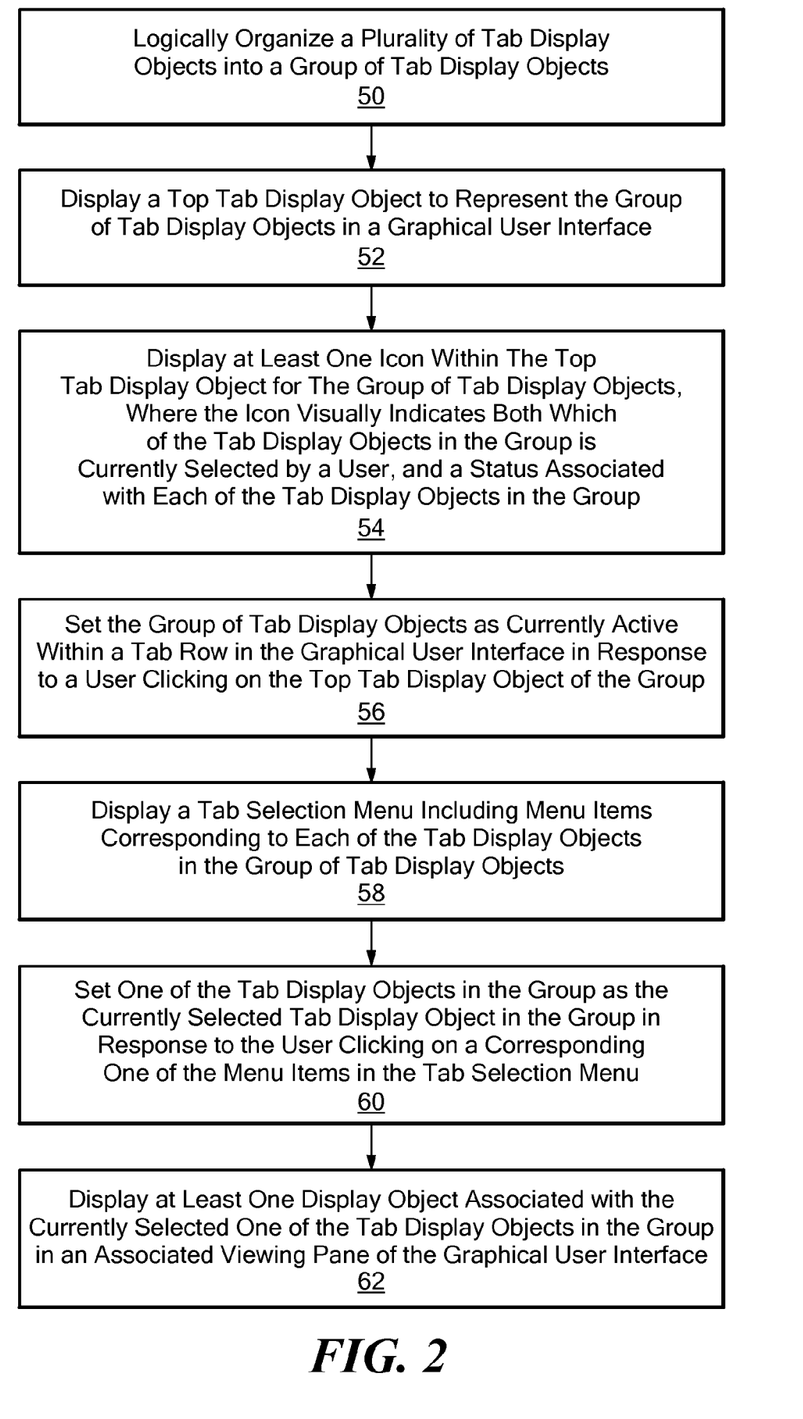
FIG. 2 is a flow chart showing steps performed in an illustrative embodiment of the disclosed system.

FIG. 2 is a flow chart showing steps performed in an illustrative embodiment of the disclosed system. At step 50, the disclosed system logically organizes multiple tab display objects into a tab display object group At step 52, the disclosed system displays a top tab display object that visually represents the group of tab display objects.

At step 54, the disclosed system displays at least one icon in the top tab display object for the tab display object group. The icon(s) displayed at step 54 visually indicates which one of the tab display objects in the tab display object group is currently selected by the user. The icon(s) displayed at step 54 also visually indicate a state or status associated with each of the tab display objects in the group of tab display objects.

In one embodiment, the icon(s) displayed at step 54 consists of multiple icons, and each of the icons corresponds to a respective one of the tab display objects in the tab group. In such an embodiment, each of the icons visually represents whether the corresponding one of said of tab display objects in the tab group is the currently selected one the tab display objects the tab group, and a current state or status of that corresponding one of the tab display objects in the tab group.

The state or status represented by the icon for a tab display object may be any specific type of state or status. For example, in an embodiment in which the tab display objects in a tab group each correspond to a different client software module under development in a software development tool, and where the view pane provides a script editor through which the user can write script to be deployed with a currently selected one of the client software modules and to be executed in response to the occurrence of a predetermined event, then each icon may visually represent a state consisting of whether any script has been written for the corresponding client software module to respond to the predetermined event. Alternatively, any other type of state or status associated with a tab display object may be represented by a corresponding icon contained in the top tab display object for the tab group.

The disclosed systems operates at step 56 to set the group of tab display objects logically organized at step 50 as currently active within a tab row in response to a user clicking on the top tab display object for the group. Also in response to a user clicking on a menu activation portion the top tab object for the tab group, for example a down arrow or other visual indicator of the presence of a menu, at step 58 the disclosed system displays a tab selection menu. The tab selection menu may, for example, be a pull down menu in which multiple menu items are displayed, each of which corresponds to one of the tab display objects in the tab group. If the user clicks on one of the menu items in the tab selection menu, then at step 60 the disclosed system sets the corresponding tab display object to the be the currently selected tab display object for the group. In response to a new tab display object becoming the currently selected tab display object for the group, the disclosed system modifies the visual appearance of the icon(s) displayed in the top tab display object for the group to reflect the newly selected current tab display object. In one embodiment, the disclosed system also displays a title of the currently selected tab display object of the group within the top tab display object of the group.

When a tab group is currently active within a tab row, the disclosed system displays one or more display objects associated with the currently selected one of the tab display objects contained in the group within a viewing area associated with the tab row. The viewing area is within the graphical user interface, and is referred to herein for purposes of explanation as the "view pane". The display objects associated with a given tab display object may consist of or include any type of displayable user interface feature or content, such as one or more widgets, a Web page, and/or some other feature or content.

Figure 3:
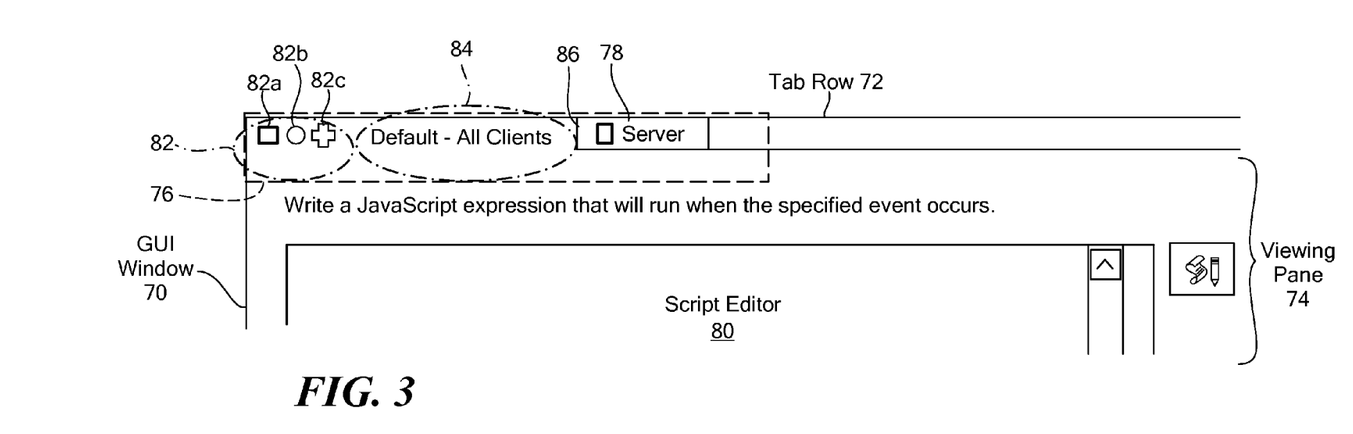
FIG. 3 is a screen shot showing a portion of a graphical user interface generated by an illustrative embodiment of the disclosed system.

FIG. 3 is a screen shot showing a portion of a graphical user interface generated by an illustrative embodiment of the disclosed system. As shown in FIG. 3, a GUI Window 70 includes Tab Row 72 and a Viewing Pane 74. The Tab Row 72 includes a Top Tab Display Object 76 for a tab group, as well as the Tab Display Object 78, which is not in a tab group. The Viewing Pane 74 is showing a Script Editor 80 that currently contains no script. The Script Editor 80 is an example of a display object that may be displayed within a viewing pane. The Top Tab Display Object 76 includes icons 82, which include a square icon 82a, a round icon 82b, and a cross icon 82c. Each of the icons 82 corresponds to a respective one of the tab display objects in the tab group represented by the Top Tab Display Object 76. In the example of FIG. 3, a currently selected one of the tab display objects in the tab group represented by Top Tab Display Object 76 is visually indicated by a corresponding one of the icons 82 being displayed relatively bolder or darker than it is when that tab display object is not currently selected. Accordingly, since the icon 82a is displayed relatively bold in FIG. 3, then the tab display object corresponding to icon 82a is the currently selected on of the tab display objects in the tab group represented by the Top Tab Display Object 76.

Further in the example of FIG. 3, each of the icons 82 visually indicates a state of the corresponding one of the tab display objects in the tab group represented by Top Tab Display Object 76 by being either filled or hollowed out. For example, if one of the tab display objects in the tab group represented by Top Tab Display Object 76 has a script associated with it, then the corresponding one of the icons 82 is filled in. Accordingly, since in FIG. 3 the user has not yet entered any script into the Script Editor 80 to be associated with any of the tab display objects in the tab group represented by Top Tab Display Object 76, all of the icons 82 are displayed as hollowed out.

The Top Tab Display Object 76 of FIG. 3 also includes a Title 84 of the currently selected tab display object in the tab group it represents. A down arrow display object 86 is also shown in Top Tab Display Object 76 as an example of a display object that can be clicked on by the user to access a tab selection menu, as further described below.

For example, in FIG. 3 the Top Tab Display Object 76 represents a tab group of three tab display objects. Each of the tab display objects in the tab group indicates which one of multiple client software module(s) in a software system under development that a script entered through the Script Editor 80 is to be associated with. A first tab display object in the tab group has a title "Default-All Client". When the "Default-All Clients" tab display object is currently selected, then any script entered into the Script Editor 80 is associated with and included in all of the client modules for the software system under development. Another tab display object in the tab group has a title "Web Client". When the "Web Client" tab display object is currently selected, then any script entered into the Script Editor 80 is associated with and included in only a Web client module of the software system under development. The third tab display object in the group has a title "Managed Client". When the "Managed Client" tab display object is currently selected, then any script entered into the Script Editor 80 is associated with and included in only a managed client module of the software system under development.

The user can cause the tab group represented by the Top Tab Display Object 76 to become currently active within the Tab Row 72 by clicking on the Top Tab Display Object 76. The user can similarly cause the Tab Display Object 78 to become currently active within the Tab Row 72 by clicking on the Tab Display Object 78. The Tab Display Object 78 has a title "Server". When the Tab Display Object 78 is currently active within the Tab Row 72, then any script entered into the Script Editor 80 are associated with and included in a server module of the software system under development. If the Tab Display Object 78 is currently active in the Tab Row 72, then the Tab Display Object 78 is made to appear to be in front of the other displayed tabs in the Tab Row 72, in this case the Top Tab Display Object 76. When the tab group represented by the Top Tab Display Object 76 is currently active in the Tab Row 72, then the Top Tab Display Object 76 is made to appear to be in front of the other displayed tabs in the Tab Row 72, in this case the Tab Display Object 78.

Figure 4:
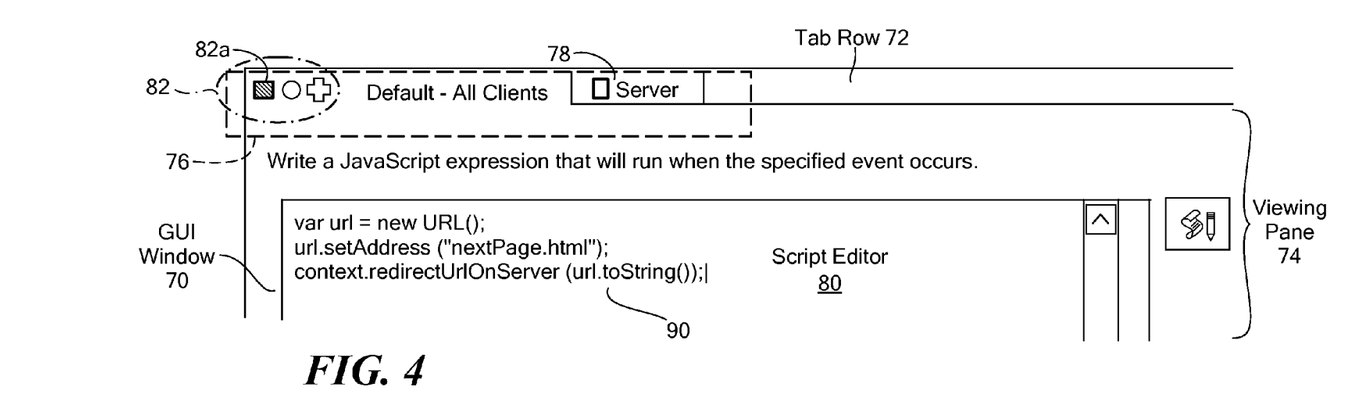
FIG. 4 is a screen shot showing the portion of the graphical user interface of FIG. 3 after a user has changed the state of a tab display object in a group of tab display objects.

FIG. 4 is a screen shot showing the portion of the graphical user interface of FIG. 3 after a user has changed the state of a tab display object in a group of tab display objects. As shown in FIG. 4, the user has typed in the script 90 into the Script Editor 80. In the embodiment of FIG. 3, any characters typed into the Script Editor 80 are considered to be script. Accordingly, after the user typed in the script 90, the visual display of icon 82a, which corresponds to the currently selected tab display object having the title "Default—All Clients", is filled in. The filled in representation of the icon 82a indicates that a script is now associated with the tab display object having the title "Default—All Clients".

Figure 5:
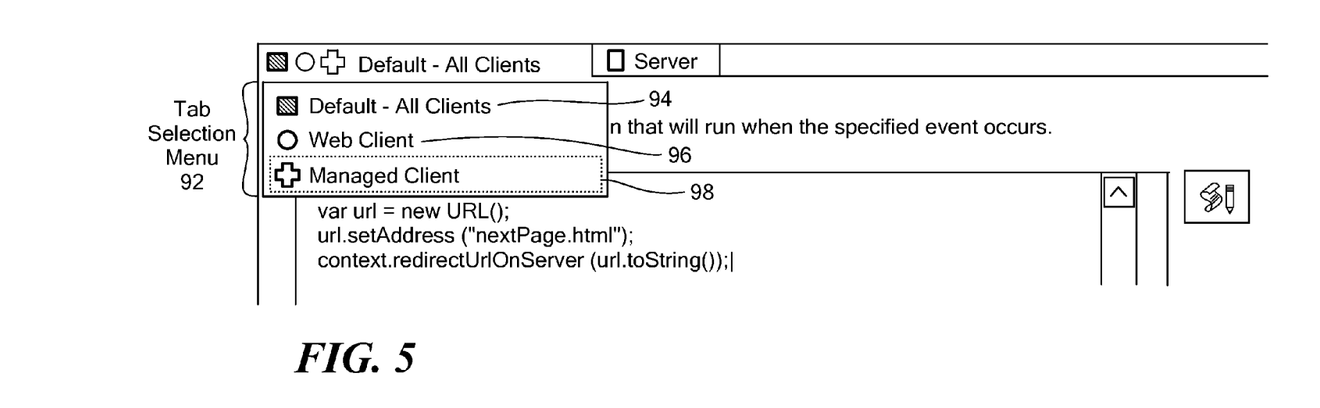
FIG. 5 is a screen shot showing the portion of the graphical user interface of FIG. 4 after a user has clicked on a top tab display object for a group of tab display objects to obtain a tab selection menu.

FIG. 5 is a screen shot showing the portion of the graphical user interface of FIG. 4 after a user has clicked on a top tab display object for a group of tab display objects to obtain a tab selection menu. As shown in FIG. 5, a user has clicked on the down arrow 86, causing the disclosed system to present the Tab Selection Menu 92. The Tab Selection Menu 92 has three menu items: a menu item 94 for the "Default—All Clients" tab display object, a menu item 96 for the "Web Client" tab display object, and a menu item 98 for the "Managed Client" tab display object. In the example of FIG. 5, the user has hovered the cursor over the "Managed Client" menu item 98, causing the "Managed Client" menu item 98 to appear visually distinct with respect to the other menu entries. The result of the user clicking on the "Managed Client" menu item 98 is that the tab display object having title "Managed Client" is made the new currently selected tab display object for the tab group represented by the Top Tab Display Object 76. The visual changes in the GUI Window 70 resulting from the user clicking on the "Managed Client" menu item are shown in FIG. 6.

Figure 6:
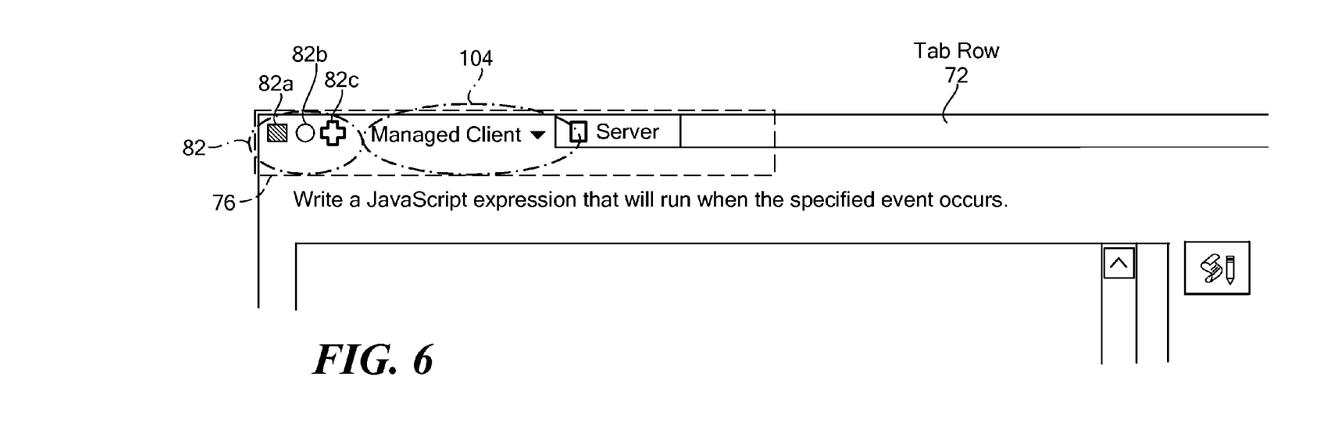
FIG. 6 is a screen shot showing the portion of the graphical user interface of FIG. 4 after a user has selected a menu item from the tab selection menu.

FIG. 6 is a screen shot showing the portion of the graphical user interface of FIG. 4 after a user has selected a menu item from the tab selection menu. As shown in FIG. 6, the icon 82*a* is no longer bolded, though it remains filled in to visually indicate the presence of script associated with the corresponding tab display object ("Default—All Clients"). Because the tab display object having the title "Managed Client" is the currently selected tab display object in the tab group represented by the Top Tab Display Object 76, the icon 82*c* is bolded. The icon 82*c* is not filled in, because there is no script associated with the tab display object having the title "Managed Client".

Figure 7:
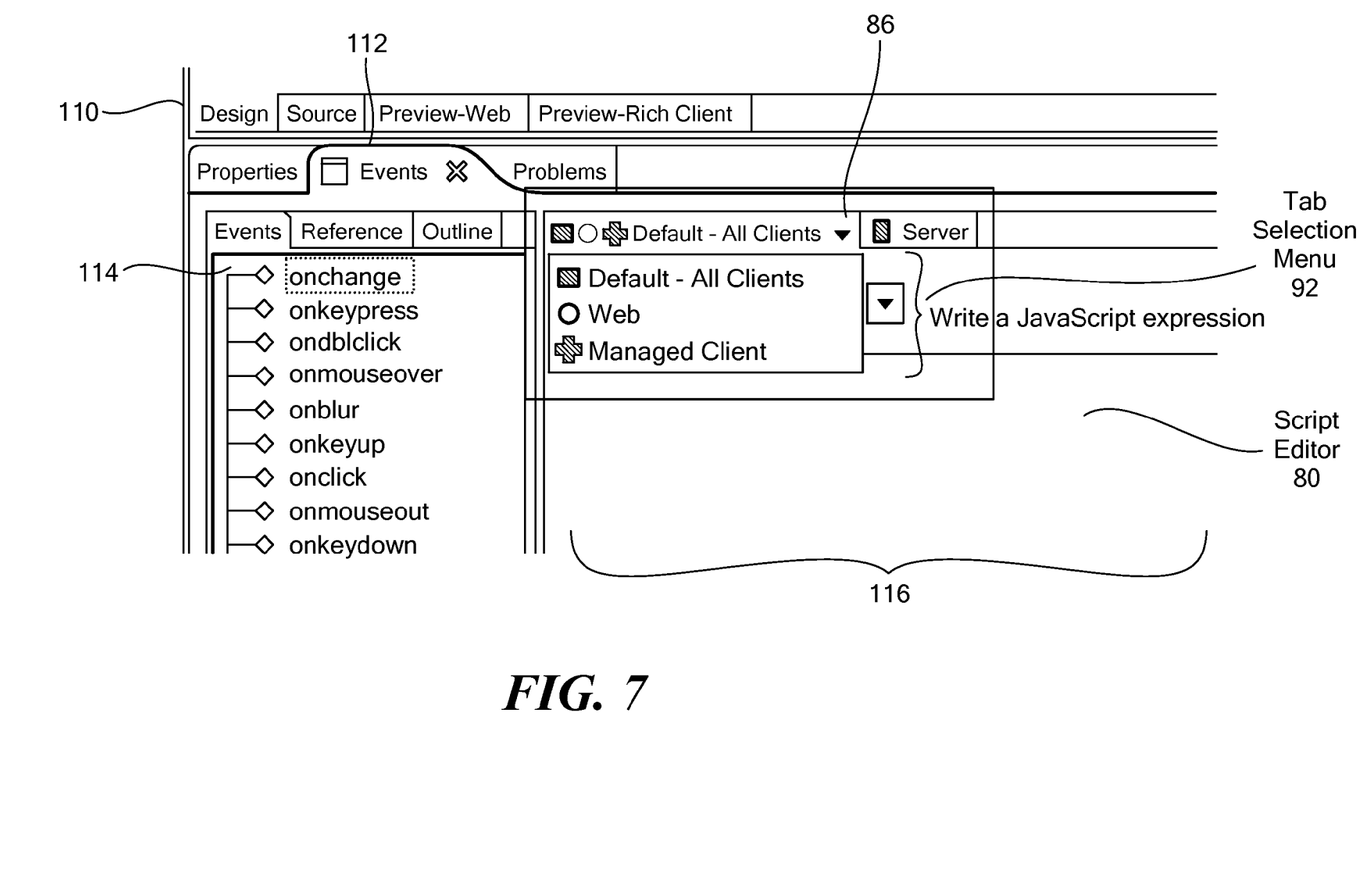
FIG. 7 is a screen shot showing aspects of an execution environment for the portion of the graphical user interface shown in FIGS. 3-6.

FIG. 7 is a screen shot showing aspects of an execution environment for the portion of the graphical user interface shown in FIGS. 3-6. As shown in FIG. 7, a user interface window 110 enables a user to enter scripts into the script editor 80 that is part of a user interface portion 116 corresponding to the GUI Window 70 of FIGS. 3-6. In the embodiment of FIG. 7, the use can select a the Events panel 112, and then select an event within that panel, such as the "onchange" event 114. The user interface portion 116 enables the user to define scripts to be associated with one or more specified modules in a software system under development, and to be run by such modules in response to the occurrence of the event selected from the Events panel 112. For example, in FIG. 7, the user has clicked on the down arrow 86, resulting in the Tab Selection Menu 92 being displayed.

Figure 8:
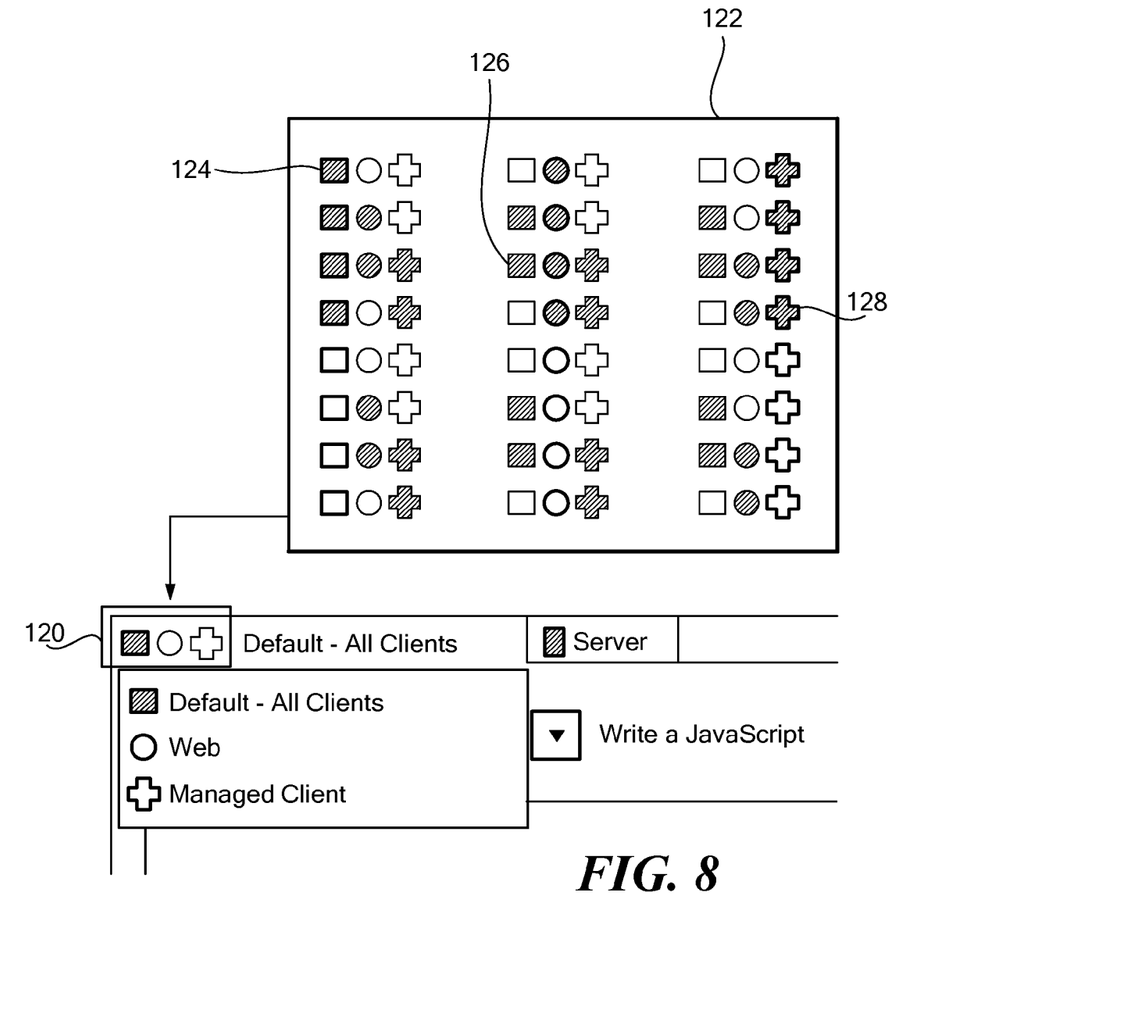
FIG. 8 shows the possible combinations of icons visually representing which tab display icon is currently selected within a group of tab display objects as well as a state of each tab display object in the group of tab display objects, as in an illustrative embodiment of the disclosed system.

FIG. 8 shows the possible combinations of icons visually representing which tab display icon is currently selected within a group of tab display objects as well as a state of each tab display object in the group of tab display objects, as in an illustrative embodiment of the disclosed system. As shown in FIG. 8, the icons 120 can be visually displayed in twenty four different visual configurations 122. For example, the icon visual configuration 124 includes a square icon that is filled in and bold, thus indicating that the tab display object corresponding to the square icon is currently selected, and has script associated with it. Further in visual configuration 124, the round icon is hollow and not bold, thus indicating that the corresponding tab display object is not currently selected, and has no script associated with it. Also, the cross icon in the visual configuration 124 is hollow and not bold, also indicating that it is not currently selected and has no script associated with it.

Further in FIG. 8, the icon configuration 126 includes a square icon that is hollow and not bold, thus indicating that the corresponding tab display object is not currently active and has no script associated with it. The round icon in the icon configuration 126 is filled in and bold, thus indicating that there is script associated with the corresponding tab display object, and that the corresponding tab display object is currently selected. The cross icon in the icon configuration 126 is filled in and not bold, thus indicating that there is script associated with the corresponding tab display object, but that the corresponding tab display object is not currently selected.

In the icon configuration 128, the square icon is hollow and not bold, thus indicating that there is no script associated with the corresponding tab display object, and that the corresponding tab display object is not currently selected. The round icon in the icon configuration 128 is filled in but not bold, thus indicating that the corresponding tab display object is not currently selected, but has script associated with it. Finally, the cross icon in the icon configuration 128 is filled in and bold, thereby indicating that there is script associated with the corresponding tab display object, and that the corresponding tab display object is currently selected.

While for purposes of explanation in the above description an embodiment has been described in which the icon(s) displayed in the top tab display object for a tab group include multiple icons, such that individual icons are visually modified to visually represent multiple states of corresponding ones of the tab display object in the group, the disclosed system is not so limited. Accordingly, the disclosed system may be embodied with any specific number of icons displayed in the top tab display object for a tab group. For example, a single icon may be displayed in the top tab display object for a tab group, and visually modified to visually represent multiple states of multiple tab display objects in a tab group.

Also, the above description refers to an embodiment in which an icon is bolded to indicate that a corresponding tab display object is currently selected within a tab group, and in which an icon is filled in to indicate a particular state associated with that corresponding tab display object, but again, the disclosed system is not so limited. Accordingly, the disclosed system may be embodied such that any particular visual variation in an icon or icons is used to visually indicate which of the tab display objects in a tab group is currently selected.

Moreover, while in the above description the tab display objects in an example of a tab group are logically related because they each are associated with one or more client modules in a software system under development, the disclosed system is not limited to any specific logical relationship between tab display objects in a group. Tab display objects in each of one or more tab groups may accordingly be logically related in any specific way, as appropriate for a given embodiment, implementation or configuration.

Finally, while the above description includes an embodiment provided in the context of a code development system, in which the state of each tab display object within a tab group is whether or not there is script associated with that tab display object, the disclosed system is also not so limited. Accordingly, the disclosed system may be embodied in any system or context in which a number of tabs are displayed to enhance user navigation in a graphical user interface.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while specific user interface constructs are used to illustrate specific embodiments of the invention, the invention is not limited to using those specific user interface constructs, and may be embodied using any specific user interface constructs that may be appropriate for a given embodiment.

We claim:

1. A method of providing a graphical user interface, comprising:

displaying a tab row in said graphical user interface, wherein said tab row provides a user with control over a separate viewing area in said graphical user interface, wherein a currently active one of a plurality of visible tab display objects within said tab row is displayed in front of other ones of said plurality of visible tab display objects within said tab row, and wherein only one of said plurality of visible tab display objects within said tab row is currently active at any time;

displaying, as one of said plurality of visible tab display objects in said tab row, a top tab display object representing a group of tab display objects, wherein each of said tab display objects in said group of tab display objects represented by said top tab display object has associated therewith a display object for display in said viewing area, wherein only said top tab display object visually represents said group of said tab display objects within said tab row, and wherein only a display object associated with a currently selected one of said tab display objects in said group of tab display objects is displayed in said viewing area responsive to said user making said top tab display object currently active within said tab row by clicking on said top tab display object; and displaying a plurality of icons within said top tab display object, each of said plurality of icons associated with a corresponding one of said tab display objects in said group of tab display objects, wherein each of said plurality of icons visually indicates, both when said top tab display object is currently active within said tab row and when another of said visible tab display objects in said tab row is currently active within said tab row, whether said corresponding one of said tab display objects in said group of tab display objects is currently selected within said group of tab display objects, and wherein each of said plurality of icons also visually indicates a status associated with said display object associated with said corresponding one of said tab display objects in said group of tab display objects.

2. The method of claim 1, further comprising:

setting, responsive to detecting said user clicking on said top tab display object, said top tab display object as currently active in said tab row;

displaying, responsive to said user clicking on a menu activation portion of said top tab display object, a tab selection menu, wherein said tab selection menu includes a plurality of menu items, wherein each menu item in said tab selection menu corresponds to one of said tab display objects in said group of tab display objects, and wherein each of said tab display objects is represented by a corresponding one of said menu items in said tab selection menu; and setting, responsive to said user clicking on one of said of menu items in said tab selection menu, one of said tab display objects as said currently selected one of said tab display objects in said group of tab display objects.

3. The method of claim 1, wherein each said display object comprises at least one widget.

4. The method of claim 1, wherein each said display object comprises a Web page.

5. The method of claim 1, further comprising displaying, in said top tab display object, a title of said currently selected one of said tab display objects in said group of tab display objects.

6. A system comprising at least one processor and a computer readable storage medium, said computer readable storage medium having program code stored thereon for providing a graphical user interface, said program code comprising:

program code for displaying a tab row in said graphical user interface, wherein said tab row provides a user with control over a separate viewing area in said graphical user interface, wherein a currently active one of a plurality of visible tab display objects within said tab row is displayed in front of other ones of said plurality of visible tab display objects within said tab row, and wherein only one of said plurality of visible tab display objects within said tab row is currently active at any time program code for displaying, as one of said plurality of visible tab display objects in said tab row, a top tab display object representing a group of tab display objects, wherein each of said tab display objects in said group of tab display objects represented by said top tab display object has associated therewith a display object for display in said viewing area, wherein only said top tab display object visually represents said group of said tab display objects within said tab row, and wherein only a display object associated with a currently selected one of said tab display objects in said group of tab display objects is displayed in said viewing area responsive to said user making said top tab display object currently active within said tab row by clicking on said top tab display object; and program code for displaying a plurality of icons within said top tab display object, each of said plurality of icons associated with a corresponding one of said tab display objects in said group of tab display objects, wherein each of said plurality of icons visually indicates, both when said top tab display object is currently active within said tab row and when another of said visible tab display objects in said tab row is currently active within said tab row, whether said corresponding one of said tab display objects in said group of tab display objects is currently selected within said group of tab display objects, and wherein each of said plurality of icons also visually indicates a status associated with said display object associated with said corresponding one of said of said tab display objects in said group of tab display objects.

7. The system of claim 6, said program code further comprising:
- program code for setting, responsive to detecting said user clicking on said top tab display object, said top tab display object as currently active in said tab row;
- program code for displaying, responsive to said user clicking on a menu activation portion of said top tab display object, a tab selection menu, wherein said tab selection menu includes a plurality of menu items, wherein each menu item in said tab selection menu corresponds to one of said tab display objects in said group of tab display objects, and wherein each of said tab display objects is represented by a corresponding one of said menu items in said tab selection menu; and
- program code for setting, responsive to said user clicking on one of said of menu items in said tab selection menu, one of said tab display objects as said currently selected one of said tab display objects in said group of tab display objects.

8. The system of claim 6, wherein each said display object comprises at least one widget.

9. The system of claim 6, wherein each said display object comprises a Web page.

10. The system of claim 6, said program code further comprising program code for displaying, in said top tab display object, a title of said currently selected one of said tab display objects in said group of tab display objects.

11. A computer program product including a computer readable storage medium, said computer readable storage medium having program code stored thereon for providing a graphical user interface, said program code comprising:
- program code for displaying a tab row in said graphical user interface, wherein said tab row provides a user with control over a separate viewing area in said graphical user interface, wherein a currently active one of a plurality of visible tab display objects within said tab row is displayed in front of other ones of said plurality of visible tab display objects within said tab row, and wherein only one of said plurality of visible tab display objects within said tab row is currently active at any time
- program code for displaying, as one of said plurality of visible tab display objects in said tab row, a top tab display object representing a group of tab display objects, wherein each of said tab display objects in said group of tab display objects represented by said top tab display object has associated therewith a display object for display in said viewing area, wherein only said top tab display object visually represents said group of said tab display objects within said tab row, and wherein only a display object associated with a currently selected one of said tab display objects in said group of tab display objects is displayed in said viewing area responsive to said user making said top tab display object currently active within said tab row by clicking on said top tab display object; and
- program code for displaying a plurality of icons within said top tab display object, each of said plurality of icons associated with a corresponding one of said tab display objects in said group of tab display objects, wherein each of said plurality of icons visually indicates, both when said top tab display object is currently active within said tab row and when another of said visible tab display objects in said tab row is currently active within said tab row, whether said corresponding one of said tab display objects in said group of tab display objects is currently selected within said group of tab display objects, and wherein each of said plurality of icons also visually indicates a status associated with said display object associated with said corresponding one of said of said tab display objects in said group of tab display objects.

* * * * *